United States Patent [19]

Taylor

[11] Patent Number: 4,532,856
[45] Date of Patent: Aug. 6, 1985

[54] END CAP FOR FLUID CYLINDER

[75] Inventor: Douglas P. Taylor, North Tonawanda, N.Y.

[73] Assignee: Tayco Developments, Inc., North Tonawanda, N.Y.

[21] Appl. No.: 576,890

[22] Filed: Feb. 3, 1984

[51] Int. Cl.³ .......................... F16J 10/02; F16J 15/18
[52] U.S. Cl. .......................................... 92/168; 92/170; 285/DIG. 22; 285/92
[58] Field of Search ............. 92/169, 170, 171, 168 R, 92/165 R, 164, 163; 285/DIG. 22, 92, 175, 390

[56] References Cited

U.S. PATENT DOCUMENTS

| | | | |
|---|---|---|---|
| 2,903,308 | 9/1959 | Barnhart | 92/168 |
| 3,665,816 | 5/1972 | Caudle | 92/168 |
| 4,086,844 | 5/1978 | Homuth | 92/168 |
| 4,105,226 | 8/1978 | Frey et al. | 285/175 |
| 4,242,947 | 1/1981 | Renner et al. | 92/164 |

Primary Examiner—Paul E. Maslousky
Attorney, Agent, or Firm—Joseph P. Gastel

[57] ABSTRACT

An end cap for a cylinder including a body portion having an outer surface and first and second ends, a bore extending between the first and second ends, an annular sealing lip surrounding the bore, an annular recess surrounding the annular sealing lip, an annular outer body portion surrounding the annular recess, with the annular recess permitting radial flexing of the annular outer body portion both toward and away from the annular sealing lip, and an annular barb on the outer surface extending circumferentially about the annular outer body portion for reception in a mating groove in the cylinder.

19 Claims, 7 Drawing Figures

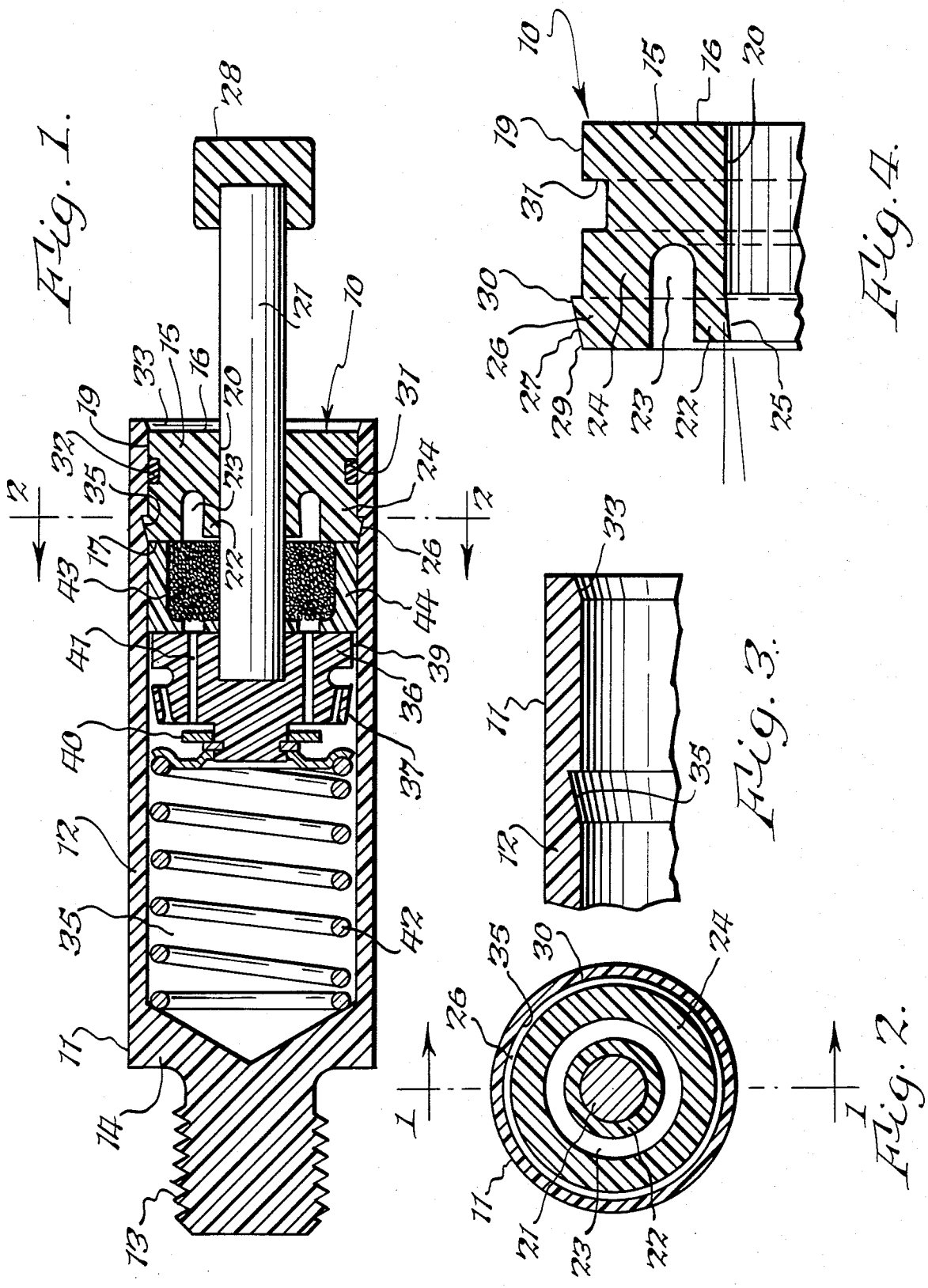

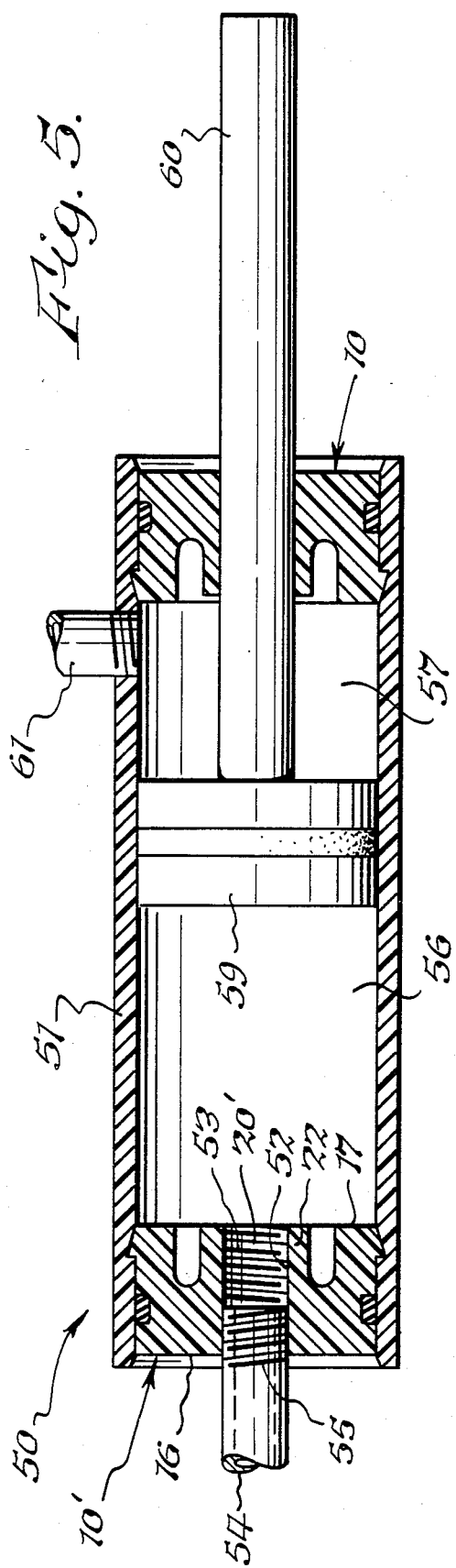
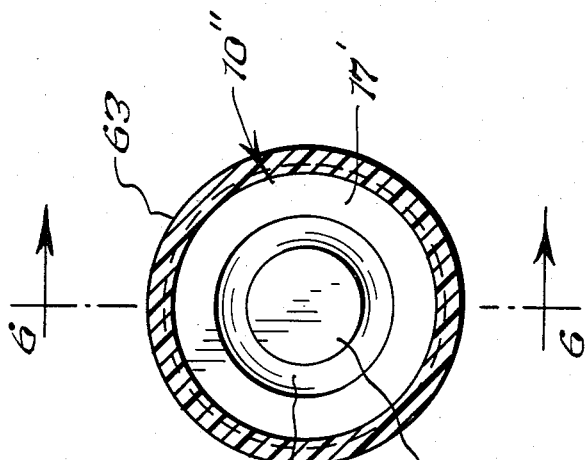
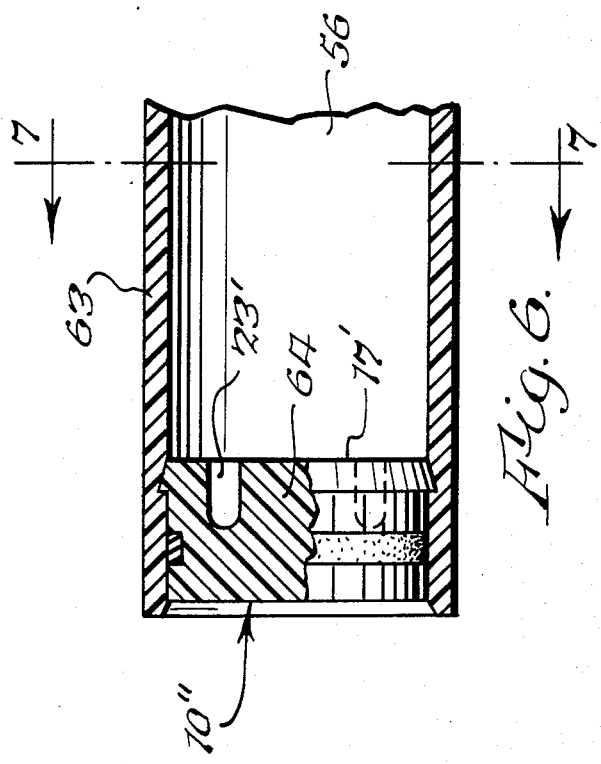

END CAP FOR FLUID CYLINDER

BACKGROUND OF THE INVENTION

The present invention relates to an improved end cap construction for a cylinder of the type used in fluid actuators and fluid energy absorber devices such as and shock absorbers and liquid springs.

By way of background, the attachment of end caps into cylinders has been difficult in the past. In this respect, in certain constructions a metal cylinder was crimped about the end cap to hold it in position. In other structures, the end cap was glued or welded in position or held by spring clips or other fastening devices.

SUMMARY OF THE INVENTION

It is one object of the present invention to provide an improved end cap for a cylinder which can be slipped into position and firmly retained therein without the use of the above-described prior modes of attachment.

Another object of the present invention is to provide an improved end cap which will receive a conduit securely against loosening because of the manner in which it is fabricated. Other objects and attendant advantages of the present invention will readily be perceived hereafter.

The present invention relates to an end cap for a cylinder comprising a body portion having an outer surface and first and second ends, an annular outer body portion at said second end, said annular outer body portion being sufficiently flexible to flex radially, and protuberance means on said outer surface extending in a circumferential direction about said annular outer body portion.

The various aspects of the present invention will be more fully understood when the following portions of the specification are read in conjunction with the accompanying drawings wherein:

BRIEF DESCRIPTION OF THE DRAWINGS

FIG. 1 is a cross sectional view taken substantially along line 1—1 of FIG. 2 and showing the improved end cap of the present invention mounted in the cylinder of a shock absorber;

FIG. 2 is a cross sectional view taken substantially along line 2—2 of FIG. 1;

FIG. 3 is an enlarged fragmentary cross sectional view of the cylinder taken substantially along line 1—1 of FIG. 2 without the end cap therein;

FIG. 4 is a fragmentary cross sectional view taken substantially along line 1—1 of FIG. 2 and showing the configuration of the end cap;

FIG. 5 is a fragmentary cross sectional view similar to FIG. 1 but showing the end cap of FIG. 1 installed at one end of the cylinder of a fluid actuator and a modified end cap at the opposite end of the cylinder;

FIG. 6 is a fragmentary cross sectional view taken substantially along line 6—6 of FIG. 7 and showing a still further modified form of end cap mounted in a cylinder; and FIG. 7 is a cross sectional view taken substantially along line 7—7 of FIG. 6.

DESCRIPTION OF THE PREFERRED EMBODIMENTS

The improved end cap 10 of the present invention is shown in FIG. 1 in position in a fluid energy absorber device 11 in the nature of a shock absorber. It will be appreciated, however, that end cap 10 may also be used in fluid actuators and other fluid energy management devices, such as liquid springs, and the fluid utilized may be either a liquid or a gas.

The shock absorber 11 includes a cylinder 12 which in this instance is fabricated from plastic but may be fabricated of high strength composite material or metal. A cylindrical screwthreaded end 13 is formed integrally with end wall 14 for mounting cylinder 12 in its operating environment.

End cap 10 is a cylindrical disc-like member fabricated of plastic, such as nylon or Delrin, and includes a body portion 15 having an outer end 16 and an inner end 17 and an outer surface 19 therebetween. A bore 20 extends between ends 16 and 17 for receiving piston rod 21. An annular lip 22 is formed integrally with the body portion 15 and surrounds bore 20. Annular lip 22 is formed by virtue of the fact that an annular groove 23 is located between annular lip 22 and outer annular body portion 24. The annular lip is formed with a taper at 25 which extends outwardly away from end 16 (FIG. 4) to thereby provide good sealing engagement with piston rod 21. An annular barb 26 is formed proximate end 17 on body portion 24. Barb 26 includes an outer inclined surface 27 leading from smaller diameter end 29 to larger diameter end 30. An annular groove 31 is located in body portion 15 and receives an O-ring 32.

Cylinder 11 includes an internal annular groove 35 having a cross sectional configuration which is complementary to barb 26. When the end cap is to be installed into cylinder 11, the smaller end 29 of barb 26 is inserted into countersunk portion 33 of the cylinder 11 and is moved into it. The existence of annular space 23 permits annular body portion 24 to flex radially inwardly as barb 26 enters the portion 34 of cylinder 11. There is in essence a camming action which produces this effect. When barb 26 reaches alignment with groove 32, it will snap into the position shown in FIG. 1 with an extremely loud noise, thereby providing an indication of proper mating. A good tight connection will thus be made which will prevent end cap 15 from being moved out of cylinder 11. The complementary mating relationship between barb 26 and groove 32 will provide a certain amount of sealing, in addition to the sealing being effected by O-ring 32. The movement of end cap 10 into the position shown in FIG. 1 will in no way harm barb 26 because flexing of portion 24 will prevent excess pressures from being applied to the barb during installation. The annular groove 23 serves the dual function of permitting flexing of annular lip 22 to provide a good seal with piston rod 21, and, further, it permits the above-described flexing of annular body portion 24 to permit installation of the end cap in the above-described manner.

The shock absorber of FIG. 1 contains compressible hydraulic fluid therein. A piston head 36 is mounted at the end of piston rod 21, and it has an outer configuration as shown at 37 and 39 which provides a fluid amplified flow of the compressible hydraulic fluid as piston head 22 moves into chamber 35. During this action movable disc valve 40 slides to the right on the piston head to obstruct bores 41 therein so that the fluid flows between the inner surface of the cylinder and surfaces 37 and 39. The movement of piston rod 21 and piston head 36 to the left is against the bias of spring 42. As is well understood, as piston rod 21 enters chamber 35, it will displace a volume of the fluid within cylinder 11. A closed cell annular foam member 43 surrounds piston rod 21 and is located in annular ring 44 interposed between end cap end 17 and the side of piston head 36. The foam member is an accumulator in that it compresses to compensate for the increased volume occupied by the piston rod 21 as it enters chamber 35. When the force applied to piston end 28 for moving piston rod 21 into cylinder 11 is removed, piston rod 21 will be moved to the right in FIG. 1 because of the expansion of spring 42. In addition, when piston rod 21 moves to the right, disc valve 40 will move to the position shown in FIG. 1 so that there can be unimpeded flow of compressible liquid from the right side of piston head 36 into chamber 35.

The compressible fluid in chamber 35 may be air, or it may be a compressible liquid, such as silicone liquid, which is 9.6% compressible at 20,000 psi, or freon, which is about 25% compressible at 20,000 psi, or butane, which is 20-25% compressible at 20,000 psi, or any other suitable compressible liquid or gas. It will also be appreciated that with suitable modification, the shock absorber of FIG. 1 may be a conventional type of shock absorber utilizing normal shock absorber fluid which is considered incompressible. In addition, if cylinder 12 is fabricated of metal or high strength plastic, it can function as a liquid spring after the elimination of foam member 43 and after possible suitable modification of the remainder of the components, except that end cap 10 can be constructed in the manner described above. Furthermore, if deemed desirable to supplement the holding force of barb 26, suitable adhesive may be applied to the outer surface of end cap 10.

In FIG. 5 a fluid pressure actuator 50 is shown having an end cap 10 of the present invention in one end thereof. It is identical in structure and installed in the same manner as described above relative to FIGS. 1-4, and no numerals other than 10 have been applied thereto. The cylinder 51 also includes a modified end cap 10' therein which is identical in all respects to end cap 10 except that the periphery 52 of bore 20' is tapped with an internal thread 53. The thread is fabricated by inserting a tap into end wall 16 and moving the tap toward end wall 17. This will cause the threads 53 to be deeper proximate end wall 16 and shallower proximate end wall 17. The shallower threads are produced because lip 22 will flex radially outwardly away from the tap during the tapping process. The practical advantage of the foregoing is that when a conduit 54 having a thread 55 thereon is threaded into tapped bore 20', the shallower threads proximate end 17 will effect locking engagement with the threads 55, whereas if the threads 20' were of uniform height and depth throughout the length of body portion 15, such locking engagement would not be obtained.

As noted above, actuator 50 is actuated by fluid which is supplied to chambers 56 or 57 on opposite sides of piston head 59 to thereby move piston rod 60. More specifically, if high pressure fluid is introduced into chamber 57 from conduit 61, piston 59 will be moved to the left and the fluid in chamber 56 will be exhausted through conduit 54. The reverse is also true.

In FIGS. 6 and 7 a further modified embodiment of the present invention is disclosed where end cap 10" provides a solid end wall to cylinder 63. End cap 10" and the portion of cylinder 63 adjacent thereto are identical in all respects to end cap 10 and the portion of the cylinder associated therewith, except that there is no bore 20 therein. Therefore, the central portion 64 is solid. However, an annular groove 23' is located in end 17' so as to permit annular body portion 24' to flex radially during insertion of end cap 10' into the position shown in FIG. 6.

Any of the end caps of the present invention may be fabricated of suitable metal, and annular body portion 24 should be sufficiently thin to flex radially to produce the above-described locking action with an associated cylinder.

If desired, whether the end cap is made of metal or plastic, flexible annular lip 22 may be eliminated, if desired, and an O-ring may be placed in a suitable groove provided in bore 20.

While preferred embodiments of the present invention have been disclosed, it will be appreciated that the present invention is not limited thereto, but may be otherwise embodied within the scope of the following claims.

What is claimed is:

1. An end cap for a cylinder comprising a plastic body portion having an outer surface and first and second ends, a bore in said body portion extending between said first and second ends, an annular flexible sealing lip surrounding said bore at said second end, an annular recess surrounding said annular flexible sealing lip at said second end, a flexible annular outer body portion surrounding said annular recess at said second end, said annular recess permitting radial flexing of said flexible annular outer body portion both toward and away from said annular flexible sealing lip and permitting flexing of said annular flexible sealing lip, and protuberance means on said outer surface extending in a circumferential direction about said flexible annular outer body portion.

2. An end cap for a cylinder as set forth in claim 1 wherein said protuberance means comprises barb means having smaller and larger diameter ends with said smaller diameter end facing said second end and said larger diameter end facing said first end.

3. An end cap for a cylinder as set forth in claim 2 wherein said barb means comprise a complete annulus.

4. An end cap for a cylinder as set forth in claim 3 wherein said barb means comprise a complete annulus.

5. An end cap for a cylinder as set forth in claim 1 including a second annular recess in said outer surface between said protuberance means and said first end for receiving a sealing ring.

6. An end cap for a cylinder as set forth in claim 5 wherein said protuberance means comprises barb means having smaller and larger diameter ends with said smaller diameter end facing said second end and said larger diameter end facing said first end.

7. An end cap for a cylinder as set forth in claim 1 in combination with said cylinder having an internal surface, a piston rod in said bore, and groove means in said internal surface for receiving said protuberance means, said internal surface of said cylinder including portions on opposite sides of said groove means which are of lesser diameter than said protuberance means.

8. An end cap for a cylinder as set forth in claim 7 wherein said groove means are of complementary mating shape to said protuberance means.

9. An end cap for a cylinder as set forth in claim 8 wherein said protuberance means comprises barb means having smaller and larger diameter ends with said smaller diameter end facing said second end and said larger diameter end facing said first end.

10. An end cap for a cylinder as set forth in claim 9 wherein said barb means comprise a complete annulus.

11. An end cap for a cylinder as set forth in claim 10 including a second annular recess in said outer surface between said protuberance means and said first end for receiving a sealing ring for effecting sealing between said outer surface and said internal surface.

12. An end cap for a cylinder comprising a body portion having an outer surface and first and second ends, a bore in said body portion extending between said first and second ends, an annular flexible sealing lip surrounding said bore at said second end, an annular recess surrounding said annular flexible sealing lip at said second end, a flexible annular outer body portion surrounding said annular recess at said second end, said annular recess permitting radial flexing of said flexible annular outer body portion both toward and away from said annular flexible sealing lip and permitting flexing of said annular flexible sealing lip, and protuberance means on said outer surface extending in a circumferential direction about said flexible annular outer body portion.

13. An end cap for a cylinder as set forth in claim 12 wherein said protuberance means comprises barb means having smaller and larger diameter ends with said smaller diameter end facing said second end and said larger diameter end facing said first end.

14. An end cap for a cylinder as set forth in claim 13 wherein said barb means comprise a complete annulus.

15. An end cap for a cylinder as set forth in claim 12 including a second annular recess in said outer surface between said protuberance means and said first end for receiving a sealing ring.

16. An end cap for a cylinder as set forth in claim 12 in combination with said cylinder having an internal surface, a piston rod in said bore, and groove means in said internal surface for receiving said protuberance means, said internal surface of said cylinder including portions on opposite sides of said groove means which are of lesser diameter than said protuberance means.

17. An end cap for a cylinder as set forth in claim 16 wherein said groove means are of complementary mating shape to said protuberance means.

18. An end cap for a cylinder comprising a plastic body portion having an outer surface and first and second ends, a bore in said body portion extending between said first and second ends, an annular lip surrounding said bore at said second end, an annular recess surrounding said annular lip at said second end, an annular outer body portion surrounding said annular recess at said second end, said annular recess permitting radial flexing of said annular outer body portion both toward and away from said annular lip, protuberance means on said outer surface extending in a circumferential direction about said annular outer body portion, a screw thread on said body means at the periphery of said bore, said screw thread being deeper proximate said first end and shallower proximate said second end.

19. An end cap for a cylinder as set forth in claim 18 wherein said annular lip is flexible.

* * * * *